(12) United States Patent
Conley et al.

(10) Patent No.: US 10,563,072 B2
(45) Date of Patent: Feb. 18, 2020

US010563072B2

(54) DEEP BASE PAINT FORMULATION

(71) Applicant: Rohm and Haas Company,
Collegeville, PA (US)

(72) Inventors: Tara Conley, Chalfont, PA (US); Mark Langille, Audubon, PA (US); James P. Maher, Freeland, MI (US); John J. Rabasco, Allentown, PA (US)

(73) Assignee: Rohm and Haas Company,
Philadelphia, PA (US)

( * ) Notice: Subject to any disclaimer, the term of this patent is extended or adjusted under 35 U.S.C. 154(b) by 110 days.

(21) Appl. No.: 15/784,390

(22) Filed: Oct. 16, 2017

(65) Prior Publication Data

US 2018/0112086 A1    Apr. 26, 2018

Related U.S. Application Data

(60) Provisional application No. 62/411,220, filed on Oct. 21, 2016.

(51) Int. Cl.

| | | |
|---|---|---|
| *C09D 7/43* | (2018.01) | |
| *C09D 7/61* | (2018.01) | |
| *C09D 7/41* | (2018.01) | |
| *C09D 7/00* | (2018.01) | |
| *C09D 133/04* | (2006.01) | |

(52) U.S. Cl.
CPC .............. *C09D 7/43* (2018.01); *C09D 7/00* (2013.01); *C09D 7/41* (2018.01); *C09D 7/61* (2018.01); *C09D 133/04* (2013.01)

(58) Field of Classification Search
CPC ... C09D 7/43; C09D 7/61; C09D 7/41; C09D 7/00; C09D 133/04
USPC .......................................................... 524/88
See application file for complete search history.

(56) References Cited

U.S. PATENT DOCUMENTS

| | | |
|---|---|---|
| 7,125,919 B2 | 10/2006 | Harris et al. |
| 7,217,761 B2 | 5/2007 | Ruhlmann et al. |
| 7,803,864 B2 | 9/2010 | Bobsein et al. |
| 9,745,478 B2 | 8/2017 | Bohling et al. |
| 9,745,492 B2 | 8/2017 | Bohling et al. |
| 2005/0150418 A1 | 7/2005 | Bakeev et al. |
| 2007/0244246 A1 | 10/2007 | Paczkowski et al. |
| 2009/0253832 A1 | 10/2009 | Bakeev et al. |
| 2009/0318595 A1 | 12/2009 | Steinmetz et al. |
| 2016/0040004 A1 | 11/2016 | Brownell et al. |

FOREIGN PATENT DOCUMENTS

| | | | |
|---|---|---|---|
| EP | 2982701 A1 * | 2/2016 | ............... C09D 7/43 |
| WO | 2001012712 B1 | 5/2001 | |
| WO | 2005068564 A1 | 7/2005 | |
| WO | 2007030626 A2 | 3/2007 | |
| WO | 2009154872 A1 | 12/2009 | |
| WO | 2010053729 | 5/2010 | |
| WO | WO-2010053729 A1 * | 5/2010 | ........... B24B 37/245 |

OTHER PUBLICATIONS

Search report from corresponding European 17197347.2 application, dated Feb. 9, 2018.

* cited by examiner

*Primary Examiner* — Ling Siu Choi
*Assistant Examiner* — Ronald Grinsted
(74) *Attorney, Agent, or Firm* — Reid S. Willis

(57) ABSTRACT

The present invention relates to a deep base paint composition comprising a binder (an aqueous dispersion of polymer particles), an associative thickener with a hydrophobic portion having a calculated log P in the range of from 2.7 to 4.8. The composition of the present invention provides a mechanism for decreasing the viscosity sensitivity of a base paint to colorant addition.

6 Claims, No Drawings

DEEP BASE PAINT FORMULATION

BACKGROUND OF THE INVENTION

This invention relates to a deep base paint formulation that shows an improvement in viscosity stability upon tinting.

The addition of a colorant to a paint at the point of sale usually results in a reduction in the paint viscosity. This presents a challenge for paint formulators who have to take into account this expected change in viscosity when formulating their color-less base paints, especially so for deep base high gloss and semi-gloss paints that contain high levels of colorant. Formulators prefer paint viscosity to be as insensitive as possible to colorant addition to ensure the same product quality and performance regardless of the amount of colorant or colorant package added to the paint. Paint rheology that is overly sensitive to colorant addition can manifest extreme changes in the rheology profile of the paint, resulting in an adverse impact on application properties such as sag resistance (dripping), leveling, in-can feel and appearance, and brush and roller-applied film build. It would therefore be an advantage in the art of coatings formulations to develop a rheology modifier that decreases the viscosity sensitivity of the base paint to colorant addition.

SUMMARY OF THE INVENTION

The present invention addresses a need in the art by providing a deep base paint composition comprising an aqueous dispersion of a) 10 to 60 weight percent, based on the weight of the deep base paint composition, of acrylic based polymer particles; b) a colorant at a concentration in the range of from 2 to 20 weight percent solids, based on the weight of the deep base paint composition; c) from 0.05 to 2 weight percent solids, based on the weight of the deep base paint composition, of an associative thickener with a hydrophobic portion having a calculated log P in the range of from 2.7 to 4.8, wherein the volume solids content of the composition is in the range of from 25 to 45 volume percent; and d) a substantial absence of extenders. The deep base paint composition of the present invention shows an improved ΔKU when adding tint to a non-colored paint.

DETAILED DESCRIPTION OF THE INVENTION

The present invention is a deep base paint composition comprising an aqueous dispersion of a) 10 to 60 weight percent, based on the weight of the deep base paint composition, of acrylic based polymer particles; b) a colorant at a concentration in the range of from 2 to 20 weight percent solids, based on the weight of the deep base paint composition; c) from 0.05 to 2 weight percent solids, based on the weight of the deep base paint composition, of an associative thickener with a hydrophobic portion having a calculated log P in the range of from 2.7 to 4.8, wherein the volume solids content of the composition is in the range of from 25 to 45 volume percent; and d) a substantial absence of extenders.

As used herein, the term "acrylic based polymer particles" refers to polymer particles that comprise at least 30% by weight of structural units of an acrylic monomer. The term "acrylic monomer" refers to one or more acrylate and/or methacrylate monomers, examples of which include methyl methacrylate ($T_g$=105° C.), ethyl methacrylate ($T_g$=65° C.), butyl methacrylate ($T_g$=20° C.), ureido methacrylate ($T_g$=100° C.), ethyl acrylate ($T_g$=−22° C.), butyl acrylate ($T_g$=−54° C.), 2-ethylhexyl acrylate ($T_g$=−85° C.), and 2-propylheptyl acrylate ($T_g$=−68° C.). Preferred combinations of acrylic monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and 2-ethylhexyl acrylate being most preferred.

The term "structural unit" of the named monomer refers to the remnant of the monomer after polymerization. For example, a structural unit of methyl methacrylate is as illustrated:

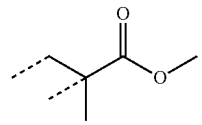

where the dotted lines represent the points of attachment of the structural unit to the polymer backbone.

The acrylic based polymer particles may also include up to 70 weight percent structural units of other non-acrylic monomers such as styrene ($T_g$=100° C.). Additionally, the polymer particles preferably comprises from 0.2, more preferably from 0.5, and most preferably from 1 weight percent, to preferably 5, and more preferably to 3 weight percent structural units of a carboxylic acid monomer such as acrylic acid ($T_g$=103° C.), methacrylic acid ($T_g$=185° C.), or itaconic acid ($T_g$=154° C.). $T_g$ refers to the glass transition temperature as calculated by the Fox equation. (See T. G. Fox, *Bull. Am. Phys. Soc.* 1, 123 (1956).)

The composition of the present invention comprises colorant at a concentration in the range of from 2, preferably from 3, more preferably from 5 weight percent solids, to 20, more preferably to 10 weight percent solids, based on the weight of the composition. The colorant is a non-white colorant and may be organic or inorganic. Examples of organic colorants include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds. Inorganic colorants include carbon black, lampblack, black iron oxide, yellow iron oxide, brown iron oxide, and red iron oxide.

The composition further comprises a substantial absence of extenders. As used herein, a substantial absence of extenders in the composition refers to less than 10, preferably less than 5, more preferably less than 1, and most preferably 0 PVC of any white, translucent, or semi-transparent inorganic particulate filler that does not impart a significant (non-white) color or hue. Thus, the composition comprises a substantial absence of $TiO_2$; $BaSO_4$; silica; silicates and aluminosilicates such as talc, clay, mica, and sericite; $CaCO_3$; nepheline; feldspar; wollastonite; kaolinite; dicalcium phosphate; and diatomaceous earth.

The associative thickener comprises a water soluble polymeric backbone with terminal or internal hydrophobic groups or both. Preferably, the concentration of the associative thickener is from 0.1 to 1.5 weight percent solids. Examples of suitable backbones include polyether, polymethacrylamide, polysaccharide, or polyvinyl backbones, preferably, a polyether backbone. More preferably, the associative thickener is a hydrophobically modified alkylene oxide urethane polymer, most preferably a hydrophobically modified ethylene oxide urethane polymer (a HEUR). This polymer may be prepared by contacting together under reactive conditions a) a diisocyanate; b) a water-soluble polyalkylene glycol; and c) a capping agent. Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers.

Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, Mich.).

Branched hydrophobically modified alkylene oxide urethane polymers are also suitable associative thickeners; they may be prepared by reacting a compound with at least three isocyanate groups or a polyol with at least three hydroxyl groups in the associative thickener preparation process. Examples of preferred compounds with three isocyanate groups include cyanurate and biuret trimers such as HDI isocyanurate (trimer), and IPDI isocyanurate (trimer):

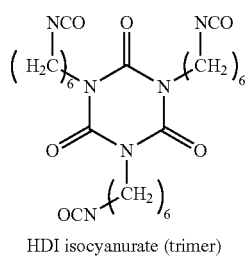

HDI isocyanurate (trimer)

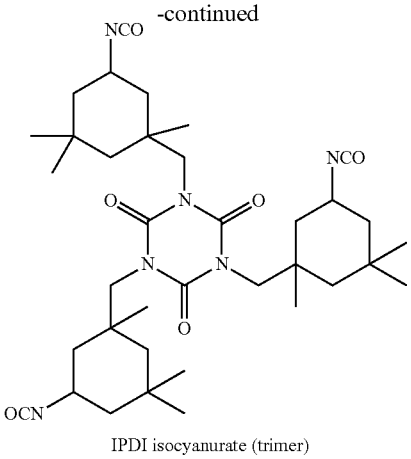

IPDI isocyanurate (trimer)

The hydrophobic portion from which calculated log P (cLog P) is derived is characterized by either of the following formulas:

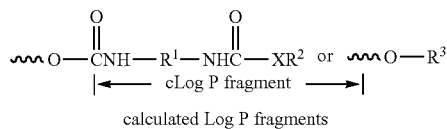

calculated Log P fragments where the oxygen atom is covalently bonded to the polymer backbone (squiggly line) through a saturated carbon atom; where $R^1$ is a divalent group and $R^2$ and $R^3$ are monovalent groups selected to achieve the desired cLog P.

Preferably, $R^1$ is a $C_4$-$C_{14}$ alkyl, a $C_5$-$C_8$ cycloalkyl, or a combination of $C_1$-$C_9$ alkyl and $C_5$-$C_7$ cycloalkyl groups.

Preferably, $R^2$ is a $C_3$-$C_{10}$ alkyl, a $C_5$-$C_8$ cycloalkyl, or a benzyl group; X is O or $NR^{2'}$ where $R^{2'}$ is H or a monovalent group selected to achieve the desired cLog P. Preferably $R^{2'}$ is H, a $C_1$-$C_6$-alkyl, a benzyl group, or a $C_5$-$C_8$ cycloalkyl group. Alternatively, $R^2$ is a tertiary amine containing alkyl, cycloalkyl, or aromatic groups that are within the scope of the desired cLog P range of this invention.

$R^3$ is preferably a $C_7$-$C_{11}$-alkyl, a dibenzylamino-$C_2$-$C_5$-alkyl, a di-$C_4$-$C_6$-alkylamino-$C_1$-$C_4$-alkyl, a $C_6$-$C_8$-alkyl-phenyl group.

The cLog P is determined using ChemBioDraw Ultra 13.0 (PerkinElmer), which uses a chemical fragment algorithm method for assessing the partition coefficient of a molecule based on its constituent parts.

Examples of combinations of $R^1$, $R^2$, and $R^{2'}$ groups within the scope of the desired cLog P range are as follows:

| $R^1$ | $R^2$ | $R^{2'}$ | X | cLog P |
|---|---|---|---|---|
| —$H_{12}$MDI- | $CH_3(CH_2)_3$— | — | O | 4.68 |
| —$H_{12}$MDI- | $CH_3(CH_2)_2$— | — | O | 4.15 |
| -IPDI- | benzyl | — | O | 3.87 |
| -IPDI- | $CH_3(CH_2)_5$— | — | O | 4.75 |
| -IPDI- | $CH_3(CH_2)_4$— | — | O | 4.22 |
| -IPDI- | $CH_3(CH_2)_3$— | — | O | 3.69 |
| -HDI- | $CH_3(CH_2)_7$— | — | O | 4.34 |
| -HDI- | $CH_3(CH_2)_6$— | — | O | 3.81 |
| -HDI- | $CH_3(CH_2)_5$— | — | O | 3.29 |
| -HDI- | $CH_3(CH_2)_4$— | — | O | 2.76 |
| -HDI- | (benzyl)$_2NCH_2CH_2$— | — | O | 4.62 |
| -HDI- | $CH_3(CH_2)_3$— | $CH_3(CH_2)_3$— | $NR^{2'}$ | 3.16 |

-continued

| R¹ | R² | R²' | X | cLog P |
|---|---|---|---|---|
| -HDI- | $CH_3(CH_2)_4$— | $CH_3(CH_2)_4$— | $NR^{2'}$ | 3.76 |
| -HDI- | $CH_3(CH_2)_5$— | H | $NR^{2'}$ | 2.90 |
| -HDI- | $CH_3(CH_2)_6$— | H | $NR^{2'}$ | 3.42 |
| -HDI- | $CH_3(CH_2)_7$— | H | $NR^{2'}$ | 3.95 |
| -HDI- | benzyl | benzyl | $NR^{2'}$ | 3.42 |
| -HDI- | cyclohexyl | cyclohexyl | $NR^{2'}$ | 4.05 |
| —$H_{12}$MDI- | benzyl | $CH_3$— | $NR^{2'}$ | 4.37 |
| —$H_{12}$MDI- | cyclohexyl | H | $NR^{2'}$ | 4.74 |
| -IPDI- | $CH_3(CH_2)_3$— | $CH_3(CH_2)_3$— | $NR^{2'}$ | 4.62 |
| -IPDI- | $CH_3(CH_2)_5$— | H | $NR^{2'}$ | 4.36 | where -$H_{12}$MDI- refers to fragments of isomers of methylenebis(isocyanatocyclohexane):

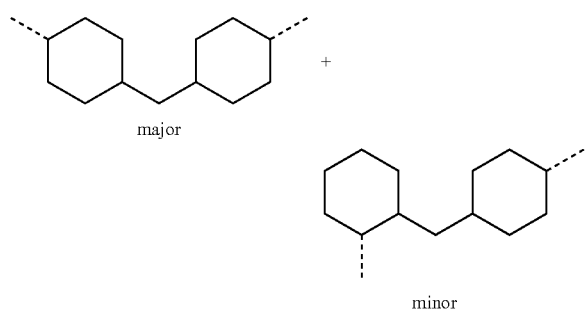

-IPDI- refers to a fragment of 1-isocyanato-3-isocyanatomethyl-3,5,5-trimethylcyclohexane:

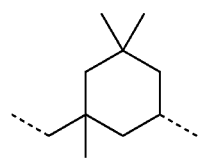

-HDI- refers to a fragment of hexamethylene diisocyanate:

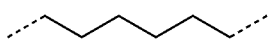

where the dotted lines represent the points of attachment of R¹ to the NH groups.

Examples of suitable —OR³ groups include —O-n-undecyl (cLog P=4.42), —O-n-decyl (cLog P=3.89), —O-n-nonyl (cLog P=3.36), —O-n-octyl (cLog P=2.83), —O-2-ethylhexyl (cLog P=2.70), —O-3,5,5-trimethylhexyl (cLog P=2.97), —O-3,7-dimethyloctyl (cLog P=3.63), —O-dibenzylaminoethyl (cLog P=3.10), —O-2-propylheptyl (cLog P=3.76), —O-diamylaminoethyl (cLog P=3.76), —O-n-octylphenyl (cLog P=4.77), and —O-2,6-dimethylheptyl (cLog P=3.10).

It has been surprisingly discovered that the deep base compositions of the present invention exhibit a smaller ΔKU upon tinting (i.e., addition of colorant) as compared with compositions that do not include associative thickeners as described herein. The composition of the present invention may include other additives such as surfactants, defoamers, coalescents, and biocides.

EXAMPLES

Intermediate Example 1—Preparation of a Rheology Modifier with cLog P of 4.34

CARBOWAX™ PEG 8000 polyethylene glycol (PEG 8000, 1751.1 g) was heated to 110° C. in vacuo in a batch melt reactor for 2 h. The reaction mixture was cooled to 85° C. Butylated hydroxytoluene (BHT, 0.184 g) and 1-octanol (29.66 g) were added to the reactor and the reaction mixture was stirred for 5 min. HDI (52.68 g) was then added to the reactor followed by 5 min of stirring. Bismuth octoate (28% Bi, 4.38 g) was then added to the reactor and the resulting mixture was stirred for 10 min at 85° C. The resulting molten polymer was removed from the reactor and cooled. Prior to testing in coating formulations, portions of this solid polymer were then dissolved in water to form a solution containing 25 wt % polymer based on the total weight of the solution.

Intermediate Comparative Example 1—Preparation of a Rheology Modifier with cLog P of 4.87

PEG 8000 (1738.9 g) and LUMULSE POE(26) glycerine (44.36 g) were heated to 110° C. in vacuo in a batch melt reactor for 2 h. After cooling the reactor contents to 85° C., BHT (0.188 g), 1-nonanol (36.24 g), and HDI (60.36 g) were added sequentially to the reactor and allowed to mix for 5 min. Bismuth octoate (28% Bi, 4.35 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 20 wt % polymer based on the total weight of the solution.

Intermediate Comparative Example 2—Preparation of a Rheology Modifier with cLog P of 5.14

PEG 8000 (1700.0 g) was heated to 110° C. in vacuo in a batch melt reactor for 2 h. After cooling to 85° C., BHT (0.16 g) and 3,7-dimethyloctanol (20.28 g) were added and the reaction was stirred for 5 min. DESMODUR N3600 polyisocyanate (6.45 g) and DESMODUR H diisocyanate (40.8 g) was then added followed by stirring for 5 min. Bismuth octoate (28% Bi, 4.25 g) was then added to the reactor and the resulting mixture was stirred for 10 min. The resultant molten polymer was removed from the reactor and cooled. Prior to testing in coating formulations, portions of this solid polymer were dissolved in water to form a solution containing 20 wt % polymer, 0.5 wt % methyl-β-cyclodextrin, and 79.5 wt % water. The volume % solids content reported in the deep base paint formulation of Table 1 refers to the volume percent solids binder based on the volume of the deep base paint formulation.

TABLE 1

| Deep Base Paint Formulation Without Colorant | |
|---|---|
| Material | Amount (g) |
| RHOPLEX ™ 800h Binder (46 wt. % solids) | 665.00 |
| Water | 85.00 |
| BYK ®-024 Defoamer | 1.00 |
| TAMOL ™ 2011 Dispersant | 19.40 |
| TERGITOL ™ 15-S-9 Surfactant | 3.00 |

TABLE 1-continued

Deep Base Paint Formulation Without Colorant

| Material | Amount (g) |
|---|---|
| KATHON ™ LX 1.5% Biocide | 1.50 |
| Ammonia (28%) | 1.79 |
| TERGITOL ™ 15-S-40 Surfactant | 3.00 |
| ACRYSOL ™ DR-110 Rheology Modifier | 5.00 |
| Subtotal | 784.69 |
| ACRYSOL ™ RM-895 Rheology Modifier | See Table |
| HEUR ICI Builder | See Table |
| Ammonia (28%) | See Table |
| Water | See Table |
| Subtotal | 91.97 |
| Total | 876.66 |
| Solids Content (volume %) | 32.0 |

RHOPLEX, TAMOL, TERGITOL, KATHON, and ACRYSOL, are all Trademarks of The Dow Chemical Company or its Affiliates.

Viscosities were measured in the paints prior to and after the addition of colorant (12 oz/gal, which equals 5.3 weight percent of solid colorant, based on the weight of the final paint). RM 895 refers to ACRYSOL RM-895 Rheology Modifier; HEUR ICI builder refers to Intermediate Example 1, Intermediate Comparative Example 1, and Intermediate Comparative Example 2.

TABLE 2

Paint KU and ICI viscosity Data

| | Example 1 Paint | Comp. Ex. 1 Paint | Comp. Ex. 2 Paint |
|---|---|---|---|
| cLogP Values | | | |
| Int Example 1 | 4.34 | — | — |
| Int. Comp. Example 1 | — | 4.87 | — |
| Int. Comp. Example 2 | — | — | 5.14 |
| Material Amounts | | | |
| RM-895 (20% active) | 2.00 | 0.45 | 1.00 |
| HEUR ICI Builder | 30.05 | 25.15 | 29.40 |
| Ammonia (28%) | 1.15 | 1.10 | 1.15 |
| Water | 58.75 | 65.25 | 60.40 |
| Viscosity Before Tinting | | | |
| KU Viscosity | 120 | 128 | 138 |
| ICI Viscosity (P) | 1.6 | 1.7 | 1.7 |
| Viscosity After Tinting | | | |
| KU Viscosity | 91 | 89 | 95 |
| ICI Viscosity (P) | 1.0 | 0.9 | 0.9 |
| Viscosity Loss on Tinting | | | |
| ΔKU Viscosity | −29 | −39 | −43 |
| ΔICI Viscosity (P) | −0.6 | −0.8 | −0.8 |

As the data suggest, the ΔKU of the paint containing a relatively low cLog P HEUR is significantly lower after tinting than the paints containing HEURS with cLog values 4.8. Lower ΔKUs are preferred because the formulator targeting a final KU of 90 does not want to start with an untinted paint with a viscosity so high as to make the paint difficult to pump and process at the site where it is made.

The invention claimed is:

1. A deep base paint composition comprising an aqueous dispersion of a) 10 to 60 weight percent, based on the weight of the deep base paint composition, of acrylic based polymer particles; b) a colorant at a concentration in the range of from 2 to 20 weight percent solids, based on the weight of the deep base paint composition; c) from 0.05 to 2 weight percent solids, based on the weight of the deep base paint composition, of an associative thickener with a hydrophobic portion having a calculated log P in the range of from 2.7 to 4.8, wherein the volume solids content of the composition is in the range of from 25 to 45 volume percent; and d) less than 10 pigment volume concentration (PVC) of extenders selected from the group consisting of $TiO_2$, $BaSO_4$, silica, silicates, aluminosilicates, $CaCO_3$, nepheline, feldspar, wollastonite, kaolinite, dicalcium phosphate, and diatomaceous earth.

2. The composition of claim 1 wherein the associative thickener comprises a polyether which is a hydrophobically modified ethylene oxide urethane polymer having hydrophobic portion that is represented by the following structure:

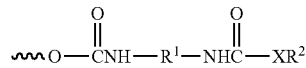

wherein X is O or $NR^{2'}$ with the proviso that

X is O and $R^1$ is —$H_{12}$MDI- when $R^2$ is $CH_3(CH_2)_3$— or $CH_3(CH_2)_2$—; or X is O and $R^1$ is -IPDI- when $R^2$ is $CH_3(CH_2)_5$— or $CH_3(CH_2)_4$— or $CH_3(CH_2)_3$ or benzyl; or X is O and $R^1$ is -HDI- when $R^2$ is $CH_3(CH_2)_7$— or $CH_3(CH_2)_6$— or $CH_3(CH_2)_5$— or $CH_3(CH_2)_4$—; or $(benzyl)_2NCH_2CH_2$—; or X is $NR^{2'}$ and $R^1$ is —$H_{12}$MDI- when $R^2$ is benzyl and $R^{2'}$ is $CH_3$—; or X is $NR^{2'}$ and $R^1$ is —$H_{12}$MDI- when $R^2$ is cyclohexyl and $R^{2'}$ is H; or X is $NR^{2'}$ and $R^1$ is -HDI- when $R^2$ and $R^{2'}$ are each benzyl, cyclohexyl, $CH_3(CH_2)_3$—, or $CH_3(CH_2)_4$—; or X is $NR^{2'}$ and $R^1$ is -HDI- when $R^2$ is $CH_3(CH_2)_5$—, $CH_3(CH_2)_6$—, or $CH_3(CH_2)_7$— and $R^{2'}$ is H; or X is $NR^{2'}$ and $R^1$ is -IPDI- when $R^2$ is $CH_3(CH_2)_5$— and $R^{2'}$ is H; or X is $NR^{2'}$ and $R^1$ is -IPDI- when $R^2$ and $R^{2'}$ are $CH_3(CH_2)_3$—;

wherein, -HDI- is a fragment of 1,6-hexamethylene diisocyanate; -IPDI- is a fragment of 1-isocyanato-3-isocyanatomethyl-3,5,5-trimethylcyclohexane; and —$H_{12}$MDI- is a fragment of isomers of methylenebis (isocyanatocyclohexane).

3. The composition of claim 1 wherein the associative thickener has a hydrophobic portion represented by ⌇⌇ $OR^3$, where $R^3$ is n-undecyl, n-decyl, n-nonyl, n-octyl, 2-ethylhexyl, 3,5,5-trimethylhexyl, 3,7-dimethyloctyl, dibenzylaminoethyl, 2-propylheptyl, diamylaminoethyl, n-octylphenyl, or 2,6-dimethylheptyl.

4. The composition of claim 1 which comprises less than 5 PVC of extenders selected from the group consisting of $TiO_2$, $BaSO_4$, silica, silicates, aluminosilicates, $CaCO_3$, nepheline, feldspar, wollastonite, kaolinite, dicalcium phosphate, and diatomaceous earth.

5. The composition of claim 4 wherein the composition comprises from 3 to 10 weight percent solids of the colorant.

6. The composition of claim 5 wherein the colorant is selected from the group consisting of phthalocyanine blue, phthalocyanine green, monoarylide yellow, diarylide yellow, benzimidazolone yellow, heterocyclic yellow, DAN orange, quinacridone magenta, quinacridone violet, organic reds, carbon black, lampblack, black iron oxide, yellow iron oxide, brown iron oxide, and red iron oxide.

* * * * *